INVENTOR.
JACQUES I. PANKOVE
BY John V. Regan
ATTORNEY

INVENTOR.
JACQUES I. PANKOVE
BY John V. Regan
ATTORNEY

INVENTOR.
JACQUES I. PANKOVE
BY John V. Regan
ATTORNEY 3,047,744

CRYOELECTRIC CIRCUITS EMPLOYING SUPERCONDUCTIVE CONTACT BETWEEN TWO SUPERCONDUCTIVE ELEMENTS

Jacques I. Pankove, Princeton, N.J., assignor to Radio Corporation of America, a corporation of Delaware Filed Nov. 10, 1959, Ser. No. 852,010
30 Claims. (Cl. 307—88.5)

The present invention relates generally to cryogenic circuits, and particularly to circuits which include a superconducting contact between two superconducting elements such as two crossed wires.

If two crossed superconducting wires of circular cross-section are placed in contact, the contact area, like the wires, is superconducting and a current can flow from one wire through the contact to the other wire. Since the contact area is much smaller than the cross-sectional area of either wire, the current density through the contact is much higher than that through the wires. Accordingly, the superconductivity of the contact can be quenched in response to current flow from one wire through the contact to the other wire without quenching the superconductivity of the wires. A discussion of this phenomenon may be found in an article by Meissner appearing in Physical Review 109, 686, 1958.

A general object of the present invention is to provide new and useful circuits employing superconducting contacts of the type discussed above.

Another object of the invention is to provide switching circuits of very high speed and small power dissipation.

Another object of the invention is to provide an improved electronically controllable inductive element.

Another object of the invention is to provide improved logic circuits such as "and" circuits.

Another object of the invention is to provide novel modulator and amplifier circuits.

The circuits of the present invention all include a small area superconducting contact between adjacent superconducting members or elements so that the resistance in the contact is zero and there is no voltage drop across the contact when current flows through the contact. The contact resistance is controlled according to one aspect of the present invention by applying a control current to one of the superconducting elements so that the control current passes adjacent to but not through the contact, whereby the magnetic field due to the control current controls the state of the contact.

In one form of the invention, an output load is placed in series with the contact. When the control current quenches the superconductivity of the contact, its resistance sharply increases, whereby the current flowing through the contact sharply decreases. Accordingly, the control current acts as a switching current.

In another form of the invention, a superconducting inductance is connected across the superconducting contact. For low values of current, the current flows through the contact rather than through the inductance so that the circuit inductance, which consists of the inductance of the leads to the contact, is low. When the current passing through the contact is increased, the superconductivity of the contact quenches and current flows instead through the superconducting inductance thereby substantially increasing the circuit inductance. These and a number of other new and useful circuits will be described in greater detail below.

The invention will be described in greater detail by reference to the following description taken in connection with the accompanying drawing in which.

Figure 1:
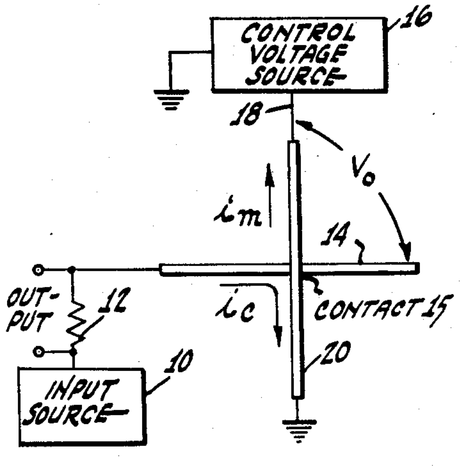
FIG. 1 is a block and schematic diagram of a general form of the invention.

In the circuit of FIG. 1, an input source 10 is connected through a load resistor 12 to a conductor or wire 14 formed of a material which is capable of becoming superconductive at low temperatures. A control voltage source 16 is connected through a lead 18 to a second conductor or wire 20 which is also capable of becoming superconductive. Wire 20 abuts wires 14 so that there is a small area contact between the two wires. The wires 14 and 20 are both immersed in a cryogenic (low temperature) environment and are maintained at a temperature such as that of liquid helium, —4.2° K. The means for obtaining cryogenic temperatures is well-known and need not be discussed here.

The circuit of FIG. 1 operates as follows. The current applied by source 10 passes through load resistor 12, through a portion of wire 14, through the contact 15 between wires 14 and 20, through a portion of wire 20, to ground. The value of current $i_c$ is such that the current density through the contact is insufficient to quench the superconductivity of the contact. Accordingly, the contact has zero resistance.

The current $i_m$ produced by source 16 passes from ground through superconducting wire 20 to source 16. The magnetic field generated by the current passing through wire 20, if of sufficient magnitude, influences the superconductivity of the contact. At a certain value of control current $i_m$, the magnetic field produced by the current quenches the superconductivity of the contact. Now the contact resistance increases from a value of zero ohms to some finite value. Accordingly, the current $i_c$ passing through the contact 15 decreases and the output voltage taken from across load resistance 12 also decreases.

Figure 2:
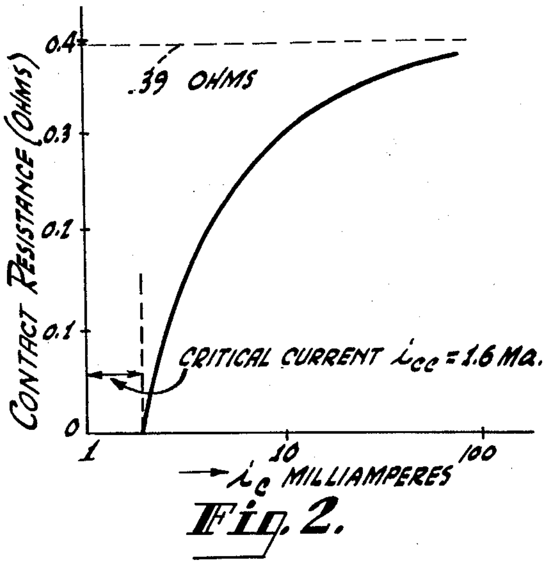
FIGS. 2 and 3 are graphs illustrating the general principles of operation of the circuits of the present invention.

The graph of FIG. 2 shows the relationship, in one particular crossed wire circuit, of the contact resistance and the current $i_c$ passing through the contact. The control current $i_m$ is not considered in this graph. The critical current $i_{cc}$ is defined as the amount of current passing through the contact which is necessary to quench the superconductivity of the contact, that is, to change the contact from its superconducting state to another state. Since the resistance of the contact, when superconducting, is zero, it may be seen from FIG. 2 that the critical current value for the particular specimen whose characteristic is plotted is about 1.6 milliamperes. Actually, at this value of current the entire contact area is not believed to be in its normal state, but instead in some state between its normal and superconducting states. Nevertheless, it may be seen that for values of current slightly greater than 1.6 milliamperes as, for example, 3 or 4 milliamperes, the resistance of the contact switches from zero ohms to a relatively large value, say 0.2 ohm. The switching time is very short—of the order of tens of millimicroseconds. It may be also observed in the graph of FIG. 2 that the maximum value of contact resistance is of the order of 0.39 ohm. At this time it is believed that the entire contact area is in its normal state and that the normal region on either side of the contact extends into the wires for a depth equal of the contact radius, forming a so-called "spreading resistance."

Figure 3:
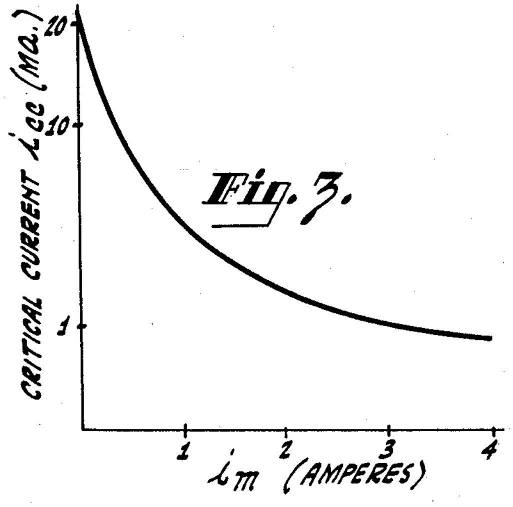

The graph of FIG. 3 shows the effect of the control current $i_m$ on the critical current $i_{cc}$. A point on the graph may be obtained by maintaining $i_m$ at a fixed value, then increasing $i_c$ until a voltage $V_o$ (see FIG. 1) is observed across the contact. This is repeated for different values of $i_m$. A sensitive galvanometer may be employed to detect $V_o$. In making this particular graph, since it was difficult to be certain of voltage readings close to the zero end of the scale, it was arbitrarily assumed that the contact had quenched when the meter read $V_o=2$ microvolts. It may be observed from the graph that as the control current $i_m$ is increased, the critical current $i_{cc}$ is decreased.

In the circuit of FIG. 1 the crossed wires 14 and 20 may be made of common superconducting material such as niobium, tantalum, lead or tin. Wire diameter is not critical and, as one example, may be 3 mils. The contact may be made by stretching the two wires across the posts of a transistor mount. These posts are short lengths of conductor mounted on an insulator base and arranged so that wires stretched between alternate posts are at right angles and in contact with one another. Preferably, the wires are freshly etched as, for example, by immersing in hydrofluoric acid for a minute or so, prior to being placed in contact.

A typical circuit such as shown in FIG. 1 may include the following circuit elements.

Control voltage source 16—a 6 volt battery in series with a 2 ohm resistor and a 50 ohm rheostat.

Source 10—a 1½ volt battery in series with a 1 ohm resistor and a 10,000 ohm rheostat.

Pulse sources or pulse sources in series with direct current sources may be substituted for the direct current sources of FIG. 1.

The circuit parameters given above are by way of example only and are not meant to be limiting. Values of circuit elements analogous to these may be used in the embodiments of the invention which follow.

Figure 4:
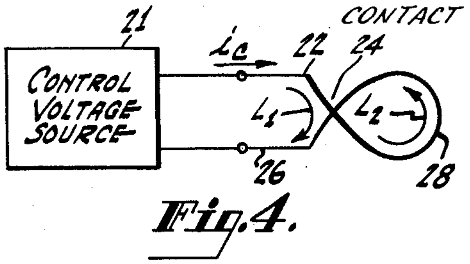
FIGS. 4 and 5 are each block and schematic circuit diagrams of parametric circuits according to the present invention.

FIG. 4 illustrates a parametric circuit and in particular one which can be switched between two values of inductance. The circuit in this figure and the ones which follow are assumed to be in a superconducting environment and the contact or contacts initially to be superconducting. In the circuit of FIG. 4, the current $i_c$ from source 21 normally flows from lead 22 through contact 24 to lead 26. It may be seen that there is also a complete circuit from lead 22 through loop 28 back to lead 26. However, since there is more inductance in this circuit than in the one through the contact and since both are of equal resistance— zero ohms, the major part of the current in the circuit takes the path of least inductance. As the current $i_c$ is increased past the critical value for the contact 24, the superconductivity of the contact quenches and the resistance in the circuit 22, 24, 26 increases substantially whereas the resistance in circuit 22, 28, 26 remains at zero ohms. Accordingly, when the current is increased past the critical value, it flows through the loop 28 and the inductance of the circuit changes from $L_1$ to $L_2$.

Figure 5:
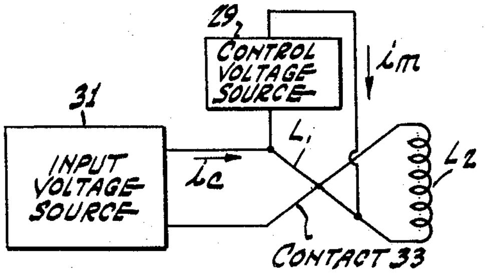

In the circuit of FIG. 5, the loop has many more turns than the loop of FIG. 4 so that when the circuit switches the inductance value is larger. The circuit is switched from one value of inductance to another by a separate control voltage source 29. In operation, current from source 31 normally flows through superconducting contact 33 and the inductance is $L_1$. When it is desired to switch the circuit inductance to $L_2$, a control current $i_m$ is applied which passes adjacent to but not through the contact. The magnetic field produced by this current quenches the superconductivity of the contact.

Figure 6:
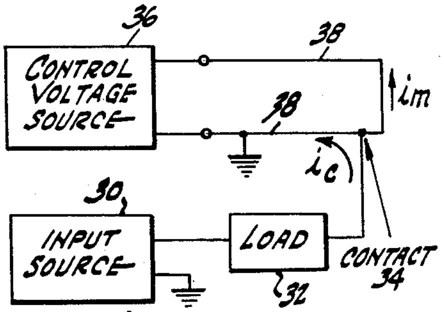
FIGS. 6 to 9 are block and schematic circuit diagrams of various forms of switches according to the present invention.

A switch is illustrated in FIG. 6. The input current $i_c$ from source 30 flows through load 32 and contact 34 to ground. The control current from source 36 passes through lead 38 and does not pass through the contact. The input current $i_c$ is below the critical value of current for the contact. In operation, in the absence of a control signal $i_m$, the current through load 32 is relatively high. If it is desired to sharply decrease the current through the load, a control current $i_m$ from the source 36 is applied of sufficient magnitude to sharply increase the contact resistance. The added resistance in the circuit sharply reduces the load current.

Figures 7, 8, 9, 10, 11:
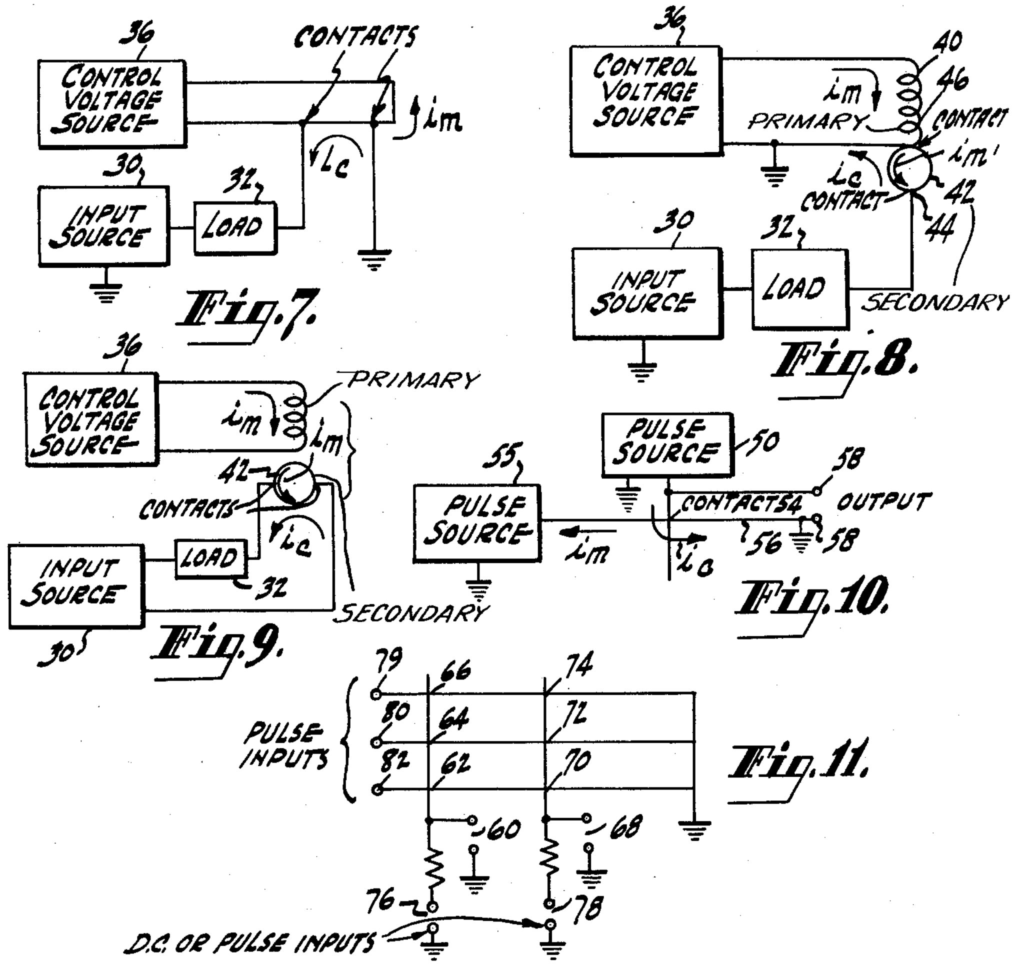
FIGS. 10 and 11 are diagrams of "and" circuits according to the present invention.

The circuit of FIG. 7 is similar to the one of FIG. 6 and similar reference numerals have been applied to comparable elements. The effect is magnified in the circuit of FIG. 7 by employing more than one contact. The input current from the source 30 flows through load 32 and both contacts to ground. Accordingly, when the control current $i_m$ is applied, both contacts are changed to their high resistance state and the resistance in series with the load is double that of the single contact of FIG. 6.

The circuit of FIG. 8 functions similarly to the circuits of FIGS. 6 and 7. However, the circuit of FIG. 8 includes means for effectively amplifying the control current. The control current circuit includes a transformer having a primary winding 40 and a secondary winding 42 consisting of a closed loop. In operation, the input current $i_c$ passes through contacts 44 and 46 to ground. A small control signal $i_m$ induces a control current $i_{m'}$ in secondary winding 42 of sufficient amplitude to quench the superconductivity of both contacts.

The circuit of FIG. 9 is similar in many respects to the one of FIG. 8. The secondary winding 42', however, is spaced from the primary winding and the contacts are isolated from the primary winding circuit. An advantage of this circuit is the ohmic decoupling between the two sources. This permits the control circuit to be at a different potential than the controlled circuit.

A simple "and" circuit is shown in FIG. 10. Pulse source 50 applies a current $i_c$ to superconducting contact 54 to ground. Pulse source 55 applies a current pulse from ground through superconducting lead 56. The presence of an output pulse from either one of the sources 50 and 55 is indicative of the binary "one" digit from that one source, and the absence of an output pulse from either one of the sources 50 and 54 is indicative of the binary "zero" digit from that one source.

In operation, if a pulse is applied from source 50 in the absence of a pulse from source 55, the contact 54 remains superconducting so that there is no voltage drop across the contact and no voltage appears across output terminals 58. Similarly, if there is a pulse applied from source 55 in the absence of a pulse from source 50, there is no voltage at output terminals 58. If, however, the input pulses from sources 50 and 55 are applied concurrently, the contact 54 is quenched so that it has a finite resistance, whereby an output voltage appears at terminals 58.

The circuit of FIG. 10 may also be used as an "or" circuit. In this case, the pulse amplitudes are such that either one alone or both together quench the contact. In this embodiment of the invention, the contact current $i_c$ is maintained at a quiescent level other than zero. This permits the state of the contact easily to be determined as, when the contact quenches, a voltage drop appears across the contact regardless of whether the quenching pulse is $i_m$ or $i_c$. If $i_c$ were normally zero and a pulse $i_m$ quenched the contact, the contact resistance would increase, but, since no current flowed across the contact, no voltage drop $V_c$ would appear.

The circuit of FIG. 11 is a combinatorial switching circuit. The switching circuit has, for example, six contacts 62, 64, 66, 70, 72 and 74 and three pulse inputs 79, 80 and 82, and a pair of outputs 60 and 68. The circuit operates on principles similar to those discussed above. All wires are superconducting as are all contacts. An output voltage will appear at output terminals 60 only if all three contacts 62, 64 and 66 are quenched. If any one of the contacts remains superconducting, there will be no voltage across that contact and terminals 60 will both be at ground potential. Similarly, there will be an output voltage at 68 only if contacts 70, 72 and 74 are quenched.

The operation of the circuit of FIG. 11 is believed to be clear from the explanation of the circuit of FIG. 10. In brief, either direct currents or pulses are applied to input terminals 76 and 78. If, concurrently with an applied pulse or an applied direct current at terminal 76, there are also pulses applied to terminals 79, 80 and 83, there will be an output at terminals 60. Similarly, coincidence of pulses at terminals 78, 79, 80 and 82 produces an output at terminals 68. Other combinatorial switching arrays also can be used, such as pyramid type, rectangular, hexagonal, and so on.

Figures 13, 14, 15:
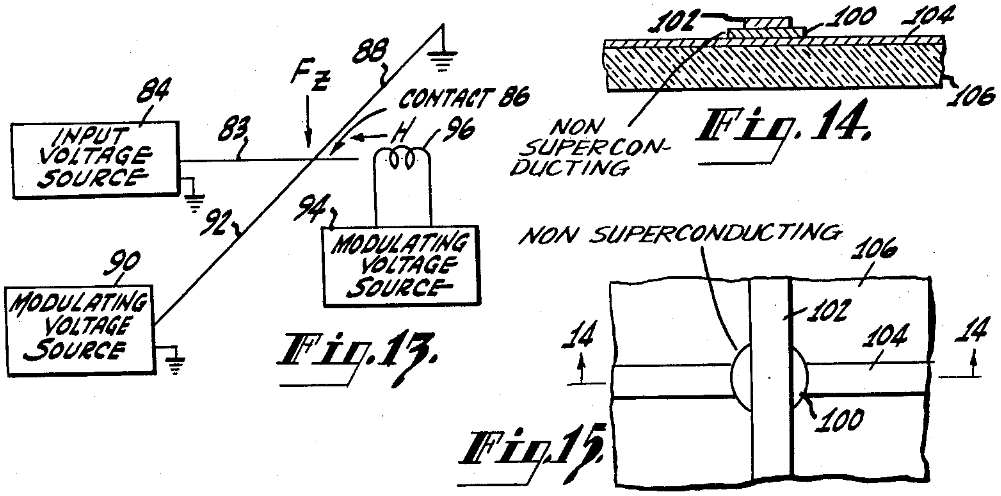
FIG. 13 is a block and schematic circuit diagram of a form of the present invention to which two modulating signals can be applied.
FIGS. 14 and 15 are cross-sectional and plan views respectively of a contact construction which may be employed in various embodiments of the invention.

The embodiment of the invention illustrated in FIG. 13 includes two means for modulating an input signal. The lower conductor or wire 83 is fixed in a reference position as, for example, by mounting it on an edge of an insulator plate (not shown). The input signal is applied from source 84 through contact 86, through conductor wire portion 88 to ground. One modulating signal is applied from source 90 through conductor portions 92 and 88 to ground. This source 90 signal does not pass through the contact 86 but it controls the resistance of the contact. The second modulating signal is applied from source 94 to coil 96. Current flowing through coil 96 produces a magnetic field H as indicated by the arrow.

In operation, the modulating current from source 90 modulates or varies the resistance of the contact in the manner already indicated. The magnetic field H induces a Lorentz force $F_z$ on upper wire 88, 92 since this wire carries a current which flows in a direction transverse to the magnetic field H. This force moves the upper wire 92, 88 with respect to the fixed lower wire 83, thereby changing the size of the contact area which, in turn, changes the resistance of the contact when not in its superconducting state. Thus, the modulating voltage from source 94 causes a change in contact resistance due to a change in contact area and the modulating voltage from source 90 causes a change in contact resistance due to a change in the resistivity of the contact. The magnetic field produced by coil 96 need not be high. It may be of the order of tens of gauss.

In the embodiments of the invention discussed thus far, the superconducting contact area is formed between two crossed wires—preferably but not necessarily at 90° to one another. Various superconducting materials such as niobium, lead, tantalum, tin and other common superconducting materials are all suitable. Moreover, the effect desired may be obtained with superconducting wires coated with a metal which is normally not a superconducting metal or which is not superconducting at the operating temperature. For example, the wires may be coated with a thin copper, gold, nickel, or tin (at 4.2° K.) plating less than a thousand angstroms thick. The thin metal layer has been found to lower the contact's critical temperature and the contact's critical current, as discussed in the Meissner article supra.

Instead of using crossed wires to make the contact, one may use an arrangement such as shown in FIGS. 14 and 15. The contact consists of a thin, normally non-superconducting metal shown at 100, such as copper sandwiched between two superconducting strips 102 and 104 which may be formed of niobium, tantalum, tin, lead or the like. The strip dimensions are not critical but may typically be of 50 microns in width and 1 micron in depth. The device may be formed by evaporating techniques and the superfluous material removed by etching, for example. The layers may be plated onto an insulated base 106 formed of quartz or Pyrex, for example. This type of contact may be used in any of the embodiments described.

In the strip conductor embodiments of the invention the contact is not of smaller cross-section than the wire. However, the apparent superconductivity of the contact quenches at a lower magnetic field (and hence a lower current density) than the superconductivity of the leads.

Figures 16, 17:
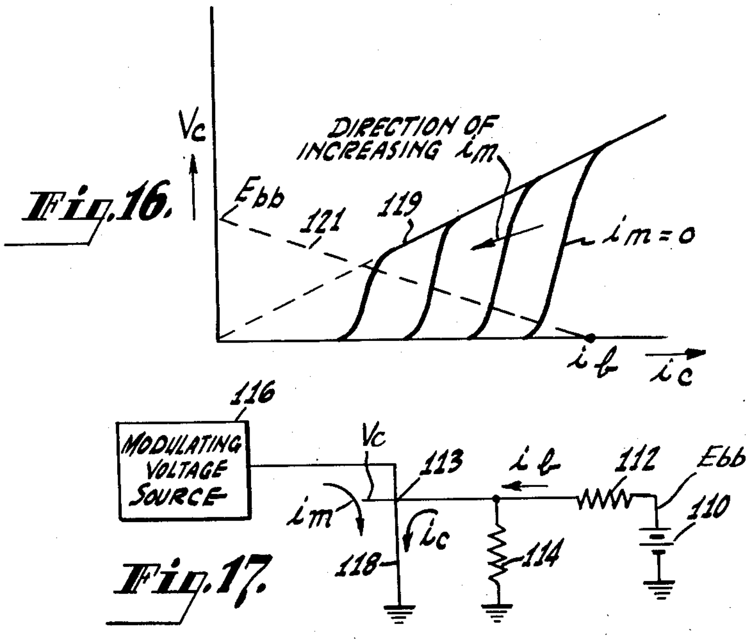
FIG. 16 is a graph to explain the operation of amplifier embodiments of the invention shown in the following figures.
FIGS. 17 and 18 are block and schematic circuit diagrams of amplifiers according to the present invention.

One form of an amplifier according to the present invention is shown in FIG. 17. A constant current source which is shown as consisting of battery 110 and resistor 112, supplies a current $i_b$. This current is applied to a superconducting contact 113 and a resistor 114 which shunts the contact. A modulating voltage source 116 applies a control current $i_m$ to lead 118 which passes adjacent to the contact.

FIG. 16 will assist in understanding the operation of the amplifier. It is a family of voltage-current characteristics for the superconducting contact 113. $V_c$ is the voltage across the contact and $i_c$ is the current flowing through the contact. As the control current $i_m$ is increased, the contact resistance is increased and the current $i_c$ flowing through the contact is decreased. The maximum voltage developed across the contact for a given modulating current $i_m$ and contact current $i_c$ is determined by the contact resistance when the contact is in its normal state. The points of voltage maxima lie on a line 119 having a slope which is equal to the resistance of the normal contact. The extension of the line passes through the origin.

In operation of the circuit of FIG. 17, the current $i_b$ is preferably sufficient so that the contact current $i_c$ quenches the superconductivity of the contact. However, the contact current $i_c$ is preferably insufficient to place the contact fully in its normal state. Variation of the modulating voltage $i_m$ will now result in variation of the contact resistance. As the contact resistance changes, the contact current $i_c$ will change as will the shunt current passing through resistor 114. The output of the circuit may be taken across resistor 114. The current through the contact in the amplifier embodiment of FIG. 17 is $i_c$; the current through resistor 114 is $i_b - i_c$; the voltage developed at the load is then $R(i_b - i_c)$; and the power delivered at the load is $R(i_b - i_c)^2$. Theoretically, since the resistance of superconducting wire 118 is zero the power input to the amplifier is also zero. Accordingly, in theory at least, this amplifier has infinite gain. In practice, however, there are losses in the driving circuit which impose a limit on the useful gain of the amplifier.

Figure 18:
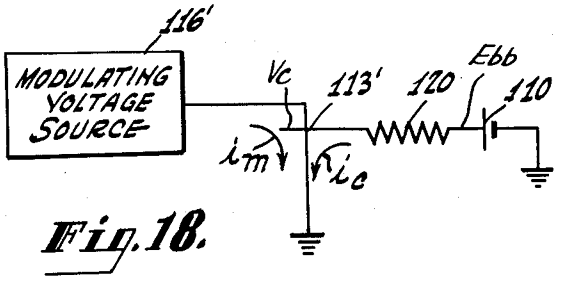

The amplifier embodiment of the invention shown in FIG. 18 is similar to that of FIG. 17 and similar reference numerals with the addition of primes have been applied to analogous elements. However, now the resistor 120 of FIG. 18 is in series with the contact 113' and, unlike the resistor 112 of FIG. 17, is of very low value. Accordingly, the source consisting of the battery 110' and resistor 120' together in the arrangement of FIG. 18 act like a constant voltage source and the load line for the circuit is as illustrated by the dashed line 121 in FIG. 16. The intersection with the contact voltage axis is a voltage $E_{bb}$ which is equal to the battery voltage 110' and the slope of the load line depends on the resistor value. As in the embodiment of FIG. 17, the power dissipated in the control circuit (the circuit through which current $i_m$ passes) is very small compared to the power output.

Figure 12:
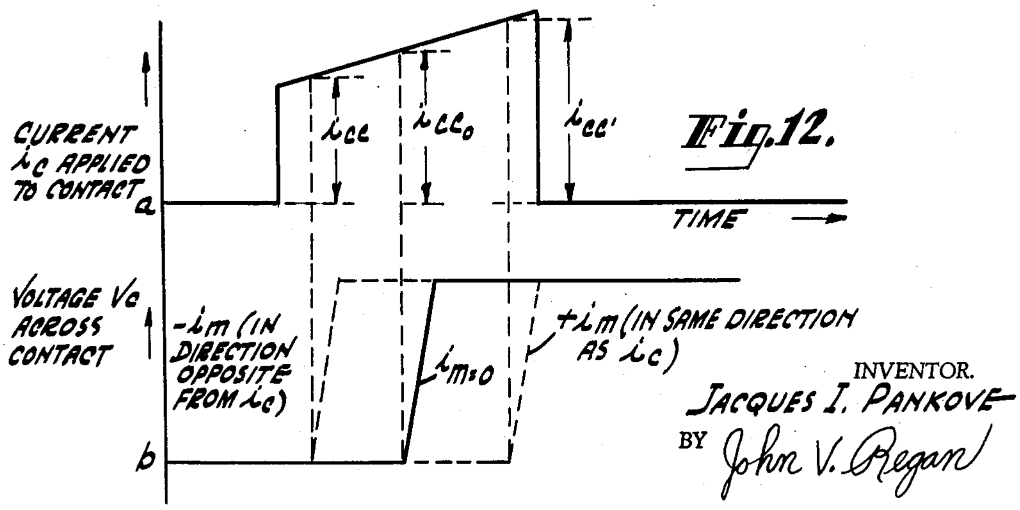
FIG. 12 is a drawing to illustrate operation of superconductive contact circuits in response to control current flow in different directions.

It has been found in the embodiments of the invention discussed above which employ a control current $i_m$ to control the resistance of a superconducting contact that the direction of control current flow with respect to the contact current $i_c$ flow affects the contact resistance. This is shown graphically in FIG. 12. The current pulse illustrated in FIG. 12*a* is one which may be applied to the contact. The gradually increasing sawtooth current is, in effect, a vernier adjustment which controls the superconducting-non-superconducting transition of the contact.

The voltage across the contact is as observed in FIG. 12*b*. It is found that when the current $i_c$ through the contact flows in the same direction in a control current lead as the control current $i_m$, the critical current $i_{cc}'$ required to quench the superconductivity of the contact increases and conversely when the current flowing through the contact is in a direction in a control current lead opposite to that of the control current in the same lead, the critical current $i_{cc}$ decreases.

What is claimed is:

1. In combination, a superconducting contact between adjacent superconducting elements, which quenches at a lower value of current flow through the contact than required to quench either of said elements; and means for increasing the contact resistance comprising means for applying to one of said elements a control current which passes adjacent to the contact so that the magnetic field due to the control current can quench the superconductivity of the contact.

2. In combination, two superconducting elements in contact with each other over an area smaller than the cross-sectional area of either element; means for applying an input current from one element through the contact to the other element; and means for modulating said input current comprising means for applying a modulating signal to said one element at an amplitude sufficient so that the magnetic field due to the modulating signal quenches the superconductivity of the contact.

3. Two sections of superconducting wire in superconducting contact with each other over an area which is substantially smaller than the cross-sectional area of either wire; a superconducting inductance extending between the wire sections; and means for applying a current to the wire sections which, when the current is less than a critical value passes mainly through the contact and when greater than a critical value quenches the superconductivity of the contact and passes through the inductance.

4. In combination, a superconducting contact between two superconducting members which quenches at a lower value of current flow through the contact than required to quench either superconducting member; means for applying an input current to the contact through said members; and means responsive to a modulating current for controlling the resistance of the contact.

5. In the combination as set forth in claim 4, said last-named means comprising means for applying a magnetic field to one of said members in a direction transverse to the current flow through said member.

6. In the combination as set forth in claim 4, said members comprising printed circuit superconducting elements.

7. In the combination as set forth in claim 4, said contact comprising a metal which is normally not capable of being made superconducting.

8. In the combination as set forth in claim 4, said contact comprising a metal selected from the group which consists of copper, nickel, gold and tin.

9. In the combination as set forth in claim 4, said members comprising wires formed of superconducting material covered with a thin conductive coating of a metal which is normally not capable of being made superconducting.

10. In the combination as set forth in claim 4, said members comprising copper plated wires formed of superconducting material.

11. A switch comprising, a first superconducting lead; at least two other superconducting leads, each in superconducting contact with the first lead, each said contact quenching at a lower value of current flow through the contact and through any lead; means for applying a current through one of said other leads, a contact, the first lead, and said other contact to the second of said other leads; and means for quenching the superconductivity of said contacts comprising means for applying a current to said first lead.

12. In the combination as set forth in claim 11, said first lead comprising a closed loop, and said means applying current to said first lead comprising means for inductively inducing current flow in said closed loop.

13. In the combination as set forth in claim 11, said first lead comprising a secondary winding of a transformer, and said means for applying a current to said first lead including the primary winding of said transformer.

14. A logic circuit comprising, in combination, a superconducting contact between two superconducting leads; first means for applying first current pulses from one lead through the contact to the other; second means for applying second current pulses to one of said leads so that the pulses do not pass through the contact; and connections for deriving an output voltage from across said contact when its superconductivity is quenched.

15. In the circuit as set forth in claim 14, said first and second means comprising means for supplying pulses of an amplitude such that solely a first or solely a second pulse does not quench the superconductivity of the contact but concurrent first and second pulses do quench the superconductivity of the contact, whereby said logic circuit is an "and" circuit.

16. In the circuit as set forth in claim 14, said first and second means comprising means for supplying pulses of an amplitude such that either said first or said second pulses quench the superconductivity of the contact, whereby said logic circuit is an "or" circuit.

17. A multiple input "and" circuit comprising a superconducting control lead; a plurality of other superconducting leads, each in small area superconducting contact with said control lead; and a connection common to all of said other superconducting leads.

18. An amplifier comprising a superconducting contact; means for applying a biasing current to the contact; means responsive to an input signal for applying a magnetic field to the contact so as to control the contact resistance; and means for deriving an amplified output signal from the contact.

19. In combination, a superconducting contact between two crossed conductors; means applying a current from one conductor through the contact to the other; a superconducting inductance in shunt with the contact, whereby when the superconductivity of the contact is quenched, current flows through the inductance; and means for quenching the superconductivity of the contact without quenching the superconductivity of the two crossed conductors.

20. In the combination as set forth in claim 19, said last-named means comprising, means for applying to one of the conductors a current which does not pass through the contact and which applies a magnetic field to the contact for quenching the superconductivity of the contact.

21. In the combination as set forth in claim 19, said last-named means comprising means for increasing the current flow through the contact to an extent sufficient to quench the superconductivity of the contact.

22. In combination, a superconducting contact between two elements which quenches at a lower value of current flow through the contact than required to quench the superconductivity of either element; means applying a current to the contact; a circuit connected to the contact which receives a current the magnitude of which depends upon the resistance of the contact; and means for modulating the resistance of the contact.

23. In the combination as set forth in claim 22, said last-named means comprising means applying a magnetic field to the contact.

24. In the combination as set forth in claim 22, said last-named means comprising means for controlling the cross-sectional area of the contact.

25. In the combination as set forth in claim 22, said last-named means comprising means for applying a modulating current to one of said elements so that the magnetic field which results is applied to the contact.

26. In combination, a plurality of spaced, first superconducting elements; a plurality of spaced, second superconducting elements, each in superconductive contact with a plurality of first elements; means for applying currents to said first elements which pass through the contacts to said second elements; and means for selectively applying currents to said second elements which pass adjacent to and quench selected contacts.

27. In the combination as set forth in claim 26, further including means in circuit with each first element for sensing when all superconducting contacts to that first element are quenched.

28. In the combination as set forth in claim 27, said sensing means comprising a load impedance in series with each first element connected beyond all contacts to that element so that when any one of the contacts to that element is superconducing, current flows through the contact rather than through the impedance whereas when all contacts to that element are quenched, current flows through said impedance.

29. In the combination as set forth in claim 26, said elements comprising superconductive wires of generally circular cross-section, whereby the contact area is substantially smaller than the wire cross-section.

30. In the combination as set forth in claim 26, the superconducting contact areas being formed of a material which requires a smaller current density be quenched than the material forming the superconductive elements.

References Cited in the file of this patent

UNITED STATES PATENTS

| | | |
|---|---|---|
| 2,877,448 | Nyberg | Mar. 10, 1959 |
| 2,913,881 | Garwin | Nov. 24, 1959 |
| 2,931,877 | Henley | Apr. 5, 1960 |
| 2,938,160 | Steele | May 24, 1960 |
| 2,944,211 | Richards | July 5, 1960 |
| 2,983,889 | Green | May 9, 1961 |

OTHER REFERENCES

Sein: IBM Tech. Disclosure Bulletin, "Cryogenic 1's Counter," vol. 2, No. 1, June 1959, page 41.